United States Patent [19]
Lowe

[11] 3,791,633
[45] Feb. 12, 1974

[54] HUMIDIFIER

[76] Inventor: Ronald C. Lowe, 23203 Via Calisero, Valencia, Calif. 91355

[22] Filed: Nov. 24, 1971

[21] Appl. No.: 201,938

[52] U.S. Cl............... 261/101, 126/113, 261/69 R, 261/118, 261/DIG. 15
[51] Int. Cl................................................ B01f 3/04
[58] Field of Search . 126/113; 261/DIG. 15, 95, 98, 261/101–104, 118, 69 R

[56] References Cited
UNITED STATES PATENTS

| | | | |
|---|---|---|---|
| 1,692,816 | 11/1928 | Chamberlain | 126/113 |
| 1,972,001 | 8/1934 | Witham, Jr. et al. | 239/549 |
| 2,319,119 | 5/1943 | Feinberg | 261/98 X |
| 2,557,042 | 6/1951 | Woolley | 261/104 X |
| 2,766,714 | 10/1956 | Hammers | 261/118 X |
| 2,845,944 | 8/1958 | Bock, Jr. | 126/113 X |
| 3,102,531 | 9/1963 | Gross | 261/DIG. 15 |
| 3,635,210 | 1/1972 | Morrow | 126/113 |
| 3,689,037 | 9/1972 | Payne | 126/113 X |

FOREIGN PATENTS OR APPLICATIONS
672,979   10/1963   Canada.............................. 126/113

*Primary Examiner*—Tim R. Miles
*Assistant Examiner*—Richard L. Chiesa
*Attorney, Agent, or Firm*—Harris, Kern, Wallen & Tinsley

[57] ABSTRACT

A humidifier for mounting in the plenum of a forced air heater and/or conditioner comprising an elongated U-shaped pan horizontally mounted in the plenum with an upwardly and slightly inwardly inclined U-shaped filter member supported therein. A spray nozzle for generating a wide-angle, flat spray is supported in the plenum opposite the filter member to direct a liquid spray across the plenum and onto the filter member transverse to air flowing upwardly in the plenum. The spray is designed to have a velocity and density relative to the upwardly flowing air sufficient to redirect the air into and through the filter member.

5 Claims, 3 Drawing Figures

PATENTED FEB 12 1974 3,791,633
FIG.1.
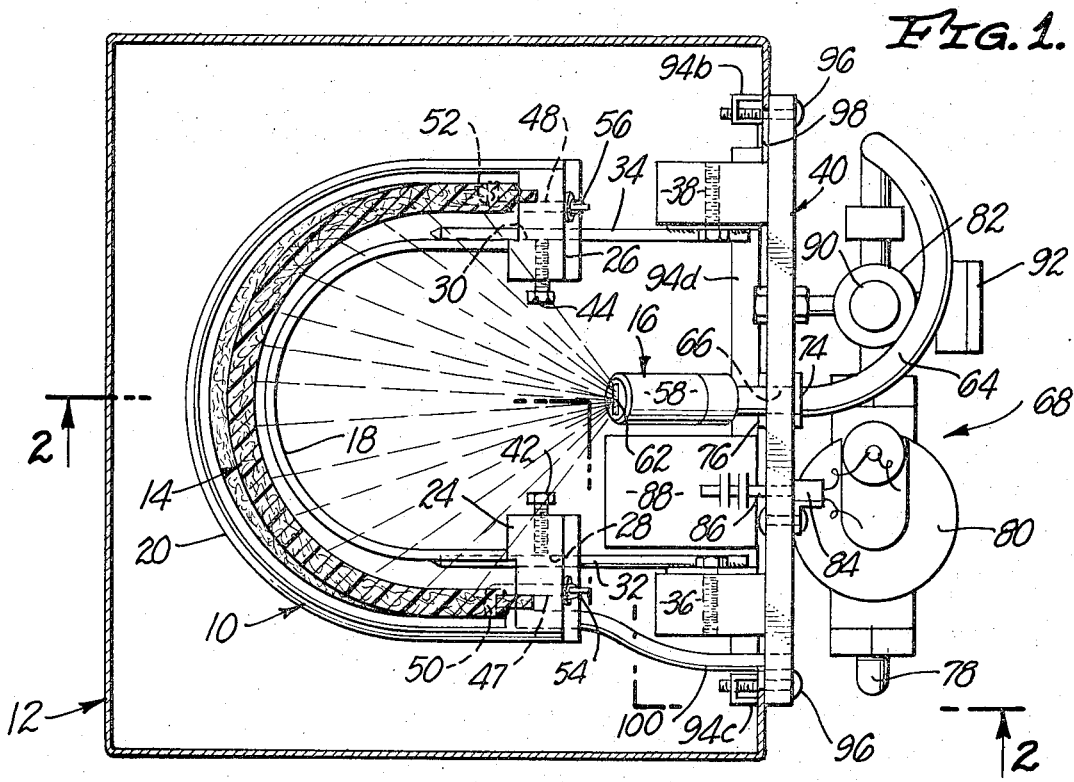
FIG.2.
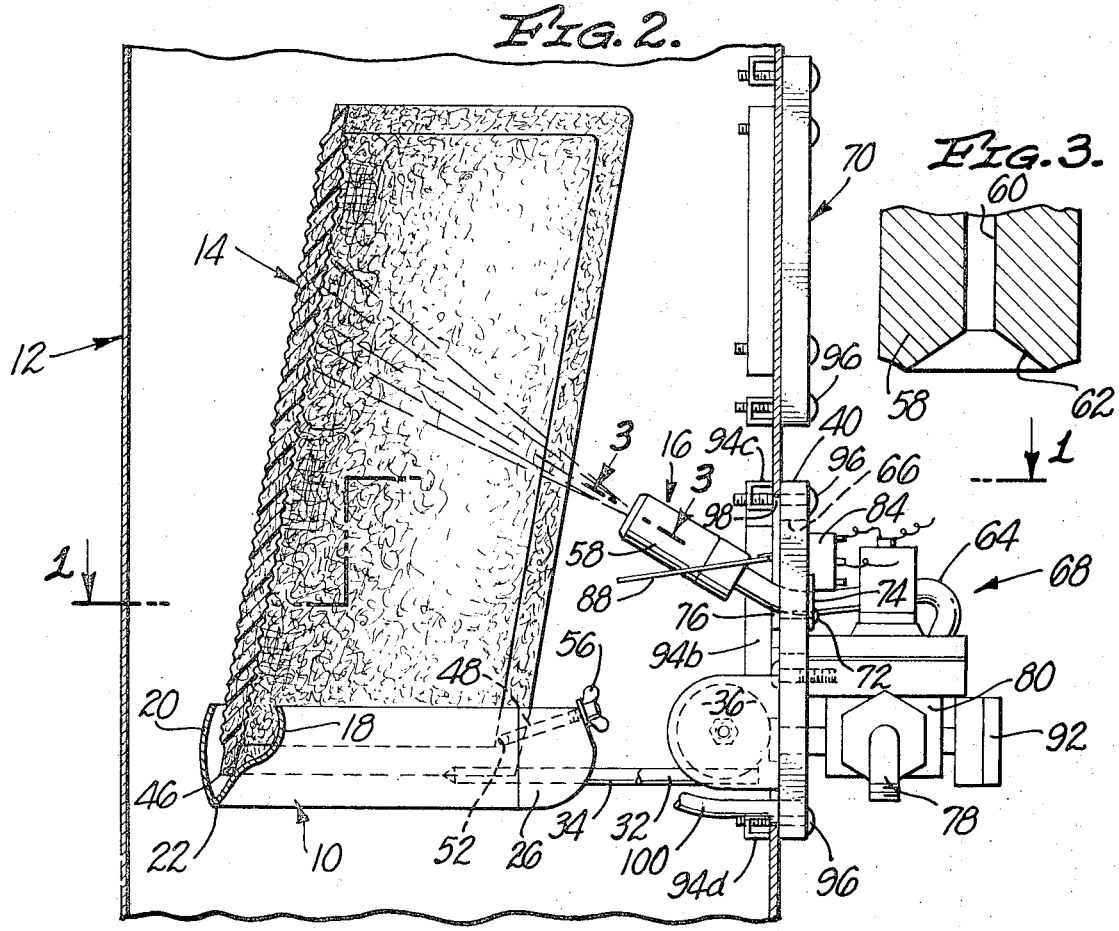
FIG.3.

HUMIDIFIER

DISCLOSURE

The present invention relates to humidifiers and more particularly to a novel humidifier construction for easy assembly and mounting in the plenum of a forced air heater and/or conditioner.

While forced air heaters are relatively efficient heating apparatus, they have the effect of greatly reducing the relative humidity in the structures heated thereby. Generally speaking, it is the function of humidifiers to raise the relative humidity in such structures to more comfortable and medically preferred levels. In this regard, medical reports show that proper humidity levels are a significant factor in guarding against the common cold and other respiratory infections. Further, proper humidity levels protect furniture and other personal articles against excessive drying and cracking.

Basically, there are commercially available today three different types of humidifiers, to wit: the traditional plate type, the rotary drum or wheel type, and the spray type. The plate type comprises a shallow open tank having a plurality of filter plates mounted in and extending vertically therefrom. The tank is partially filled with water to immerse a bottom portion of each of the plates. Water is drawn upwardly into the plates and dry hot air is directed over the plates to transfer moisture thereto.

The rotary type of humidifier comprises an open tank in which is mounted a drum or wheel of filter material. The tank is partially filled with water to cover a lower portion of the drum or wheel. The drum or wheel is continuously rotated on a motor driven shaft. This insures water saturation of an upper portion of the drum which is exposed to a stream of dry hot air to transfer moisture thereto.

Spray-type humidifiers generally comprise a nozzle connected to a water supply for producing a high velocity fine mist spray through which dry hot air from the forced air heater is directed. The air absorbs most of the moisture from the mist to raise the level of relative humidity of the air transported through the forced air heating system.

Unfortunately, each of the commercially available types of humidifiers possesses serious disadvantages and limitations. For example, the plate type humidifiers require repeated attention to replace water in the tank. This can be a particularly annoying problem when the humidifier is in a difficult-to-reach area. Further, in mounting the tank must be level to insure that all of the plates are sufficiently immersed in water and that the water will not spill from the tank during filling to the desired level. In addition, the filter plates tend to rapidly clog with lime and other deposits from the water. They also are subject to corrosion. When the plates are clogged or corroded, plate-type humidifiers are nearly useless.

Rotary type humidifiers, on the other hand are rather expensive and usually present a severe restriction to air passing therethrough. Also, they require repeated servicing to refill the water tank. Moreover, the moving parts of such humidifiers are subject to corrosion and attack by lime deposits which impair their efficient operation.

In the spray-type humidifier, impurities in the water mist are carried by the air into the structure serviced by the forced air heater and are deposited on furniture and the like leaving a whitish film. Further, not all of the water in the spray is absorbed by the moving air. Some is deposited in the ducts supporting the spray nozzle to cause problems of possible corrosion and leakage into the interior of the structure.

All of the foregoing types of humidifiers possess another important limitation in that they require careful preadjustment or selection by skilled personnel, if the desired relative humidity is to be achieved in areas serviced thereby. In this regard, the selection, preadjustment, and installation of a humidifier of proper size and capacity presently involves careful advanced mathematical calculations in terms of duct size, furnace plenum temperature, air velocity, and room size. Such calculations generally require a humidification or air conditioning expert and materially increase the costs of such humidifiers and their installation.

Further, in the Western United States, homes do not have basements where the furnaces may be conveniently located. Rather, forced air furnaces and air conditioners have been relegated to isolated areas such as closets, attics, rooftops, and the like. Such areas are hard to reach and severely increase the difficulty of installing and servicing presently available humidifiers.

Moreover, the plenum and ducts of forced air heaters are of various sizes and shapes. Since present day humidifiers are of a fixed size and not adjustable, this means that humidifier manufacturers must produce a relatively large line of humidifiers to fit the various forms of heating system configurations.

In view of the foregoing, it is a general object of the present invention to provide simple and economical apparatus for efficiently raising to desired levels the relative humidity in forced air heating systems without requiring the use of water storing tubs, rotating or otherwise moving parts, and without materially restricting the flow of air in the plenum and ducts of such heating systems.

Another object of the present invention is to provide a relatively inexpensive, trouble-free and long-lasting humidifier which is simple in structure and is easily installed in the plenum of forced air heaters and/or conditioners.

A further object of the present invention is to provide a humidifier of the foregoing character which presents a minimum resistance to air flow.

Still another object of the present invention is to provide a humidifier of the foregoing character which is manually adjustable for ready installation in the plenum of forced air heaters of all sizes and shapes by unskilled personnel and which may be easily installed in plenums of heaters located in difficult to reach and isolated areas.

A still further object of the present invention is to provide a humidifier for mounting in the plenum of a forced air heater comprising an elongated pan mounted horizontally in the plenum with a filter member extending upwardly therefrom for receiving water in the form of a spray transversing the plenum from a nozzle with a velocity and density sufficient to redirect upwardly flowing air into and through the filter member.

Another object of the present invention is to provide a humidifier of the foregoing character wherein the pan is shaped to direct air upwardly along opposite sides of the filter member to assist in the transfer of moisture from the filter to the upwardly flowing air.

A further object of the present invention is to provide a humidifier of the foregoing character wherein the pan and nozzle are laterally and angularly adjustable to insure that the resultant vector of the upwardly flowing air is through the filter member.

Other objects and advantages of the present invention may be more clearly understood by reference to the following detailed description, when considered with the drawing, which, by way of example only, illustrates one form of humidifier embodying the features of the present invention.

In the drawing:

FIG. 1 is a top view of a humidifier embodying the features of the present invention taken along the line 1—1 in FIG. 2;

FIG. 2 is a side view of the humidifier of FIG. 1 taken along the line 2—2 in FIG. 1; and FIG. 3 is an enlarged fragmentary sectional view of a head of a nozzle included in the humidifier taken along the line 3—3 in FIG. 2.

Generally speaking, the humidifier of the present invention comprises an elongated pan 10 mounted horizontally in the plenum 12 of a forced air heater with a filter member 14 extending upwardly therefrom and facing a nozzle 16. The nozzle is inclined upwardly at an acute angle to the horizontal and is designed to produce a wide-angle, flat water spray across the plenum and onto the filter member 14 transverse to dry hot air flowing upwardly in the plenum. The spray possesses a velocity and density relative to the upwardly flowing air sufficient to redirect the air into, through, and along the filter member 14. As droplets of water in the spray and in the filter come into intimate engagement with the dry hot air, moisture is transferred thereto to produce an air stream of increased relative humidity for distribution by the forced air heating system.

More specifically, in the illustrated form of the invention, the pan 10 and filter member 14 are generally U-shaped in plan, with the pan comprising inner and outer side walls 18 and 20 joined along a lower edge 22 and extending upwardly therefrom. As illustrated in FIG. 2, the side walls 18 and 20 are somewhat concavo-convex in cross section. Thus, air flowing upwardly in the plenum 12 and engaging the pan is directed by the side walls upwardly along inner and outer surfaces of the filter member 14 to increase the interaction and contact between the air and the water contained in the filter member.

Opposite ends of the U-shaped pan 10 are closed by end members 24 and 26 having horizontal bores 28 and 30 for slidably receiving horizontal support arms 32 and 34. The support arms are secured by blocks 36 and 38 to a base plate 40 which anchors the humidifier to the plenum 12. Thus supported on the arms 32 and 34, the pan 10 may be moved and prepositioned in the plenum at predetermined locations relative to the nozzle 16. To secure the pan in such positions, hand-turnable set screws 42 and 44 extend into the blocks 24 and 26 to engage and releasably lock against sides of the arms 32 and 34 (See FIG. 1).

The U-shaped filter member 14 is preferably formed of a polyethylene plastic mesh capable of developing an electrostatic charge in response to air flowing therethrough. A bottom 46 of the filter member rests on the inner side wall 18 of the pan to vertically support the filter in the pan to extend upwardly through an open top thereof. Further support for the filter member is provided by a pair of hook members 47 and 48. The hook members extend through downwardly inclined holes in the end members 24 and 26 to hook into openings 50 and 52 in the filter member adjacent the bottom 46. Opposite ends of the hook member are threaded to receive wing nuts 54 and 56 for tightening against ends of the members 24 and 26 to secure the filter member in place. It bears noting that the filter member 14 is inclined upwardly and slightly inwardly from the vertical at about a 9° angle. Thus, the filter member forms a hollow substantially semifrustoconical member having an inner surface facing the nozzle 16.

The nozzle 16 includes a head 58 having a central port 60 terminating in a vertically narrow, horizontally wide and outwardly angled mouth 62 (see FIG. 3). The head 58 is connected to a length of flexible tubing 64 passing through a vertically elongated slot 66 in the base plate 40 for connection to apparatus 68 for supplying water to the nozzle 16. The flexible tubing 64 may be moved vertically by hand in the slot 66 to preadjust the height and angle of the nozzle in the humidifier relative to the height of the filter member 14 and its displacement from the nozzle. In this regard, it is important that the nozzle 16 be preadjusted to an angle and height such that the resultant vector of air flowing upwardly into the open bottom of the semifrustoconical filter member is through the filter member. Stated differently, it is important that for a given velocity and density of spray, the nozzle angle and height be preadjusted relative to the filter member such that the spray acts as an inclined top or roof for a cavity defined by the spray and the inner surface of the filter member to direct the upwardly flowing air through the filter member. Once proper positioning of the nozzle 16 is achieved, it may be secured in place by tightening a screw 72 passing through a washer 74, base plate 40, and into a half-washer 76 supporting the underside of the tubing 64 within the plenum.

As illustrated in the drawing, the water supplying apparatus 68 is supported by the base plate 40 and comprises an elbow 78, a solenoid operated valve 80 and a pressure regulator 82 all of conventional design and connected in series with the tubing 64. The solenoid actuated valve 80 is secured to the base plate 40 with the winding of its solenoid connected in series circuit with a master control switch and source of power (not shown) and a normally open sail switch 84. The sail switch is controlled by a movable arm 86 extending through the base plate 40 and supporting a sail 88 within the plenum 12.

In operation, the master control switch is closed. Air flowing upwardly in the plenum then strikes the sail 88 causing upward movement of arm 86 and closure of the sail switch 84. This completes the series circuit through the solenoid winding to open the valve 80. As this occurs, water from a hose connected to the elbow 78 flows through the valve and into the pressure regulator 82. In the regulator, the water pressure is controlled to a value determined by the position of an adjustment knob 90 and indicated on a guage 92. The water then flows from the regulator 80 through the tubing 64 to the nozzle 16 for dispensing as a flat spray of predetermined velocity, density, and angle. In this regard, it bears noting that control of the fluid pressure by the regulator 82 changes not only the spray velocity but also its angle or width. At and above a given pressure, water flows outwardly through the central port 60 in the head 58 and follows the inclined side walls of the mouth 62 to produce a spray of maximum angle. As water pressure is reduced below the predetermined value, the water does not follow the angled wall of the mouth 62, thereby reducing the angle and width of the spray.

The adjustability of the quantity, angle and width of the spray emanating from the nozzle 16 by manual control of the knob 90, combined with the adjustability of the pan 10 and the angle and height of the nozzle 16 are extremely important features of the invention. They provide means for changing the size and capacity of the humidifier and enable it to be easily mounted in plenums of various sizes and shapes by unskilled installers. Further, after mounting, the foregoing features permit the humidifier to be accurately adjusted during operation to a condition of maximum efficiency and to a condition where the desired humidity is achieved in the area serviced by the humidifier. All this may be accomplished without the services of humidification or air conditioning experts and without the need for careful mathematical calculations to determine in advance the optimum size and capacity of the humidifier.

With regard to the foregoing, the humidifier of the present invention incorporates a removable transparent window 70 in the plenum immediately above the base plate 40. With the humidifier mounted in the plenum and in operation, the installer simply views the operation of the humidifier through the transparent window. By viewing the operation of the humidifier through the window and noting the flow of spray across the plenum and the quantity of water dripping down the filter member and into the pan, the installer can simply and quickly determine whether or not the humidifier is properly adjusted to produce the desired degree of relative humidity in the area being serviced. If it is not, he may regulate the quantity and width of spray emanating from the nozzle 16 by turning the control knob or he may remove the window and move the pan 10 and hence the filter member 14 toward or away from the nozzle. Further, after remounting the window in the plenum, the installer may angularly raise or lower the nozzle while monitoring the operation of the humidifier through the window until the resultant vector of air flowing upwardly into the open bottom of the semifrustoconical filter member is through the filter member.

As to the removability of the window 70, the window 70 and the base plate 40 are mounted by like means to a side wall of the plenum 12. Such mounting means is designed for quick installation and for easy removal of the base plate and window. Since the mounting means are the same, only that associated with the base plate 40 will be described in detail.

As illustrated, the mounting means comprises four U-shaped channel brackets 94a, b, c, and d. The brackets are loosely connected to the base plate 40 along the four edges thereof by self-tapping screws 96 extending through holes in the extreme inside edge of each channel. The screws 96 securing the bracket 94a along an upper edge of the base plate pass through vertically elongated holes to permit the bracket to be moved vertically below and above an upper edge of the base plate. In a like manner, the screws 96 securing the bracket 94b along a right edge of the base plate pass through horizontally elongated holes to permit the bracket to move laterally inside and outside the right edge of the base plate.

With the brackets thus attached to the base plate, it is a simple matter to secure the base plate 40 to the plenum 12. This is accomplished by moving the brackets 94a and 94b inside the upper and right edges of the base plate 40 and by slipping the brackets through a base plate receiving opening 98 in the plenum with the base plate positioned, as illustrated in FIG. 2. Next the screws 96 carrying the brackets 94a and 94b are moved outwardly to properly position the brackets and all screws tightened to grip the side wall of the plenum between the brackets and a marginal edge of the base plate.

The removal of the base plate 40 (and window 70) is likewise a simple matter. All that is required is a loosening of the screws 96 and a movement of the brackets 94a and 94b inside the upper and right edges of the base plate. The plate may then be moved from the plenum.

By way of summary, with the base plate 40 and window 70 mounted in place by the brackets 94 and screws 96, and with the humidifier components properly adjusted, the humidifier is started by closing the master control switch. Dry hot air flowing upwardly in the plenum 12 then effects a closure of the sail switch 84 to complete an electrical circuit to the solenoid actuated valve 80 opening the valve. Water flows through the valve; pressure regulator 82 to the nozzle 16. At the nozzle, the water is directed as a flat, wide-angle spray across the plenum and onto the inner surface of the filter member 14. The velocity and density of the spray is sufficient to redirect the upwardly flowing air in the plenum into, through, and along the filter member where moisture is transferred to the air to increase the relative humidity thereof. Any water not absorbed by the air flows downwardly within the filter member 14 for depositing in the pan 10. A drain 100 is connected to the pan and extends through the base plate 40 to a collecting tray or to a hose for transport from the humidifier.

Further, as the air passes through the filter member, minerals are trapped and not allowed to travel with the treated air for distribution by the forced air heating system. In this regard, the flow of spray to the filter member and downward migration of water therethrough effects a continuous washing of the filter member to maintain it free of such mineral deposits.

In addition, the streamlined nature of the pan 10 and upwardly inclined design of the filter member 14 presents a minimum restriction to air flow in the forced air heating system. This is true whether the humidifier is functioning as a humidifier with the spray flowing from the nozzle or simply as an electrostatic filter, as when water is not being dispensed by the nozzle. In such a case, the electrostatic charge built up by air flowing over the filter member attracts foreign particles from the air to filter the air of contaminants.

In view of the foregoing, it should be appreciated that the present invention provides a simple and economical apparatus for efficiently raising to desired levels of relative humidity in forced air heating systems without requiring the use of water storing tubs, rotating or otherwise moving parts and without materially restricting the flow of air in the plenum and ducts of such heating systems. Moreover, the humidifier of the present invention is relatively inexpensive, trouble-free, and long-lasting and may be adjusted for easy installation in the plenum of forced air heaters of all sizes and shapes.

While a particular humidifier structure has been described in some detail herein, it is appreciated that changes and modifications may be made therein without departing from the spirit of the invention. It is therefore intended that the present invention be limited in scope only by the terms of the following claims.

I claim:

1. A humidifier for mounting in the plenum of a forced air heater and/or conditioner comprising:

an elongated pan having an open top;

means for horizontally mounting said pan in said plenum;

an open top filter member extending vertically from said open top of said pan;

nozzle means for producing a high velocity wide-angle, liquid spray;

means including pressure regulating means for supplying liquid to said nozzle means to produce a nonvarying liquid spray; and means for mounting said nozzle means in said plenum adjacent an inner wall thereof facing said filter member to direct said high-velocity liquid spray only across said plenum and onto said filter member transverse to air flowing upwardly in said plenum, said spray having a velocity and density relative to said upwardly flowing air sufficient to redirect portions of said air into, through, and upwardly along said filter member.

2. The humidifier of claim 1 wherein said means for mounting said pan and means for mounting said nozzle means are manually adjustable and provide independent adjustment of the horizontal position of said pan and vertical adjustment of the angle of said liquid spray respectively and wherein said pressure regulating means is hand adjustable, whereby said pan, filter member, nozzle, and pressure regulator may be adjusted relative to the velocity of said upwardly flowing air to insure that a resultant vector of said air is through said filter member.

3. The humidifier of claim 1 wherein:

said pan and said filter member are generally U-shaped in plan;

said nozzle means includes a head having a wide mouth port for producing a wide-angle, flat liquid spray; and said means for mounting said nozzle means supports said nozzle means at an upward acute angle to the horizontal such that said flat liquid spray acts as an upwardly inclined substantially air impervious top of a cavity defined by said spray and an inner surface of said filter member for redirecting said upwardly flowing air through said filter member.

4. A humidifier of claim 2 wherein said pan includes inner and outer sidewalls joined along a lower edge and extending upwardly therefrom, said sidewalls being substantially concavo-convex in cross section to direct air engaging said pan upwardly along inner and outer surfaces of said filter member.

5. The humidifier of claim 3 wherein said filter member inclines upwardly and slightly inwardly from a base thereof in said open top of said pan to define a hollow substantially semifrustoconical member.

* * * * *